(12) United States Patent
Sun et al.

(10) Patent No.: US 11,512,014 B2
(45) Date of Patent: Nov. 29, 2022

(54) SALINE GLYCERINE WASTEWATER TREATMENT SYSTEM AND TECHNOLOGY

(71) Applicant: Qingdao University of Science and Technology, Qingdao (CN)

(72) Inventors: Xiaoyan Sun, Qingdao (CN); Xingwang Zang, Qingdao (CN); Liang Wang, Qingdao (CN); Li Xia, Qingdao (CN); Shuguang Xiang, Qingdao (CN)

(73) Assignee: Qingdao University of Science and Technology, Qingdao (CN)

( * ) Notice: Subject to any disclaimer, the term of this patent is extended or adjusted under 35 U.S.C. 154(b) by 55 days.

(21) Appl. No.: 16/931,405

(22) Filed: Jul. 16, 2020

(65) Prior Publication Data

US 2020/0346961 A1    Nov. 5, 2020

(51) Int. Cl.

| | |
|---|---|
| *C02F 9/00* | (2006.01) |
| *B01D 1/26* | (2006.01) |
| *B01D 9/00* | (2006.01) |
| *C02F 1/00* | (2006.01) |
| *C02F 1/04* | (2006.01) |
| *C02F 1/52* | (2006.01) |
| *C02F 1/68* | (2006.01) |
| *C02F 3/00* | (2006.01) |

(Continued)

(52) U.S. Cl.
CPC ............... *C02F 9/00* (2013.01); *B01D 1/26* (2013.01); *B01D 9/0022* (2013.01); *B01D 2009/0086* (2013.01); *C02F 1/004* (2013.01); *C02F 1/048* (2013.01); *C02F 1/52* (2013.01); *C02F 1/683* (2013.01); *C02F 3/00* (2013.01); *C02F 2001/5218* (2013.01); *C02F 2101/12* (2013.01); *C02F 2101/34* (2013.01); *C02F 2103/36* (2013.01); *C02F 2209/02* (2013.01); *C02F 2301/046* (2013.01)

(58) Field of Classification Search
CPC ........................................................ C02F 9/00
See application file for complete search history.

(56) References Cited

U.S. PATENT DOCUMENTS

| 4,111,759 A | * | 9/1978 | Didycz | ................... C02F 1/586 |
|---|---|---|---|---|
| | | | | 203/96 |
| 2016/0138433 A1 | * | 5/2016 | Janicki | ..................... B01D 1/04 |
| | | | | 60/671 |

FOREIGN PATENT DOCUMENTS

CN        107032382 A   *   8/2017   .............. C01F 11/18

* cited by examiner

*Primary Examiner* — Peter Keyworth

(57) ABSTRACT

The present invention discloses a saline glycerine wastewater treatment system and technology. The whole technological process mainly includes a reaction process, an evaporation process, a crystallization process, a filtration process and a drying process. The present invention first proposes the use of an "ammonia-alkali reaction principle" to treat high-salt glycerine wastewater, which mainly solves the problem of treating a large amount of calcium chloride-containing glycerine wastewater produced in the production process of propylene oxide and epichlorohydrin in chlor-alkali industry, and places emphasis on solving the problems that low value-added calcium chloride produced in the wastewater treatment process of a traditional method has low quality, is basically accumulated as solid waste and is difficult to treat, and chloride ions have adverse effects on the biochemical process of wastewater treatment. By-products of high-quality calcium carbonate and ammonium chloride products have high economic benefits and social environmental protection benefits.

4 Claims, 1 Drawing Sheet

(51) Int. Cl.
*C02F 101/12* (2006.01)
*C02F 101/34* (2006.01)
*C02F 103/36* (2006.01)

SALINE GLYCERINE WASTEWATER TREATMENT SYSTEM AND TECHNOLOGY

TECHNICAL FIELD

The present invention belongs to the technical field of environmental protection, relates to a saline glycerine wastewater treatment system and technology, and more particularly relates to treatment of high-salt high-COD wastewater containing calcium chloride and glycerine mixture produced in the production process of, propylene oxide and epichlorohydrin by a chlorohydrin method and wastewater treatment of some similar components. The technology of the present invention is mainly used for wastewater treatment in the production process of propylene oxide and epichlorohydrin.

BACKGROUND

In the industrial production process of propylene oxide and epichlorohydrin, a large amount of glycerine wastewater containing high salt is produced at the bottom of a cyclization tower. Due to high content of calcium chloride solutes, high chloride ion content and poor biodegradability, the glycerine wastewater cannot directly enter a wastewater treatment system for biochemical treatment, causing many problems in the aspects of economic operation of enterprises and environmental governance, thereby seriously limiting the industry development. Therefore, a reasonable and feasible method is urgently needed to solve such technical problems.

The patent with publication number CN 101798154 B describes an epichlorohydrin production method for saponification and cyclization wastewater. Calcium chloride is obtained by first evaporating and concentrating and then crystallizing, and then glycerine is adsorbed by resin, and then desorbed with water and rectified to obtain a glycerine product. The patent application document with publication number CN 102557164 B provides a process for treating glycerine wastewater containing NaCl, specifically comprising: removing industrial wastewater containing glycerine and high content of sodium chloride through an evaporation process; respectively collecting evaporation water and solid sodium chloride; washing the solid sodium chloride with, a hydrochloric acid solution to remove the glycerine; and then separating the hydrochloric acid solution containing the glycerine to obtain purified solid sodium chloride.

In addition, the patent with publication number CN 102503014 B discloses a method for treating glycerine wastewater containing sodium chloride. Organic glycerine is extracted by using n-butanol, and through sodium chloride crystallization, finally the glycerine and the n-butanol are separated by a multi-tower rectification manner. CN103342434 A discloses a calcium chloride product which is finally obtained by treatment manners including steps of hydrolysis, advanced oxidation or wet oxidation, concentration and drying for high salinity organic wastewater.

In conclusion, for the current treatment of saline glycerine wastewater, the technical means of evaporation, rectification and ion exchange are generally adopted, so that not only the process is complicated and the energy consumption is high, hut also the finally outputted calcium chloride product has high impurity content and low economic benefit.

Therefore, the technical problem to be urgently solved by those skilled in the art is how to develop a saline glycerine wastewater treatment system and technology having simple technology and low energy consumption and capable of obtaining high-quality products.

SUMMARY

In view of this, the purpose of the present invention is to provide a saline glycerine wastewater treatment system with respect to the problems in the prior art.

To achieve the above purpose, the present invention adopts the following technical solution:

A saline glycerine wastewater treatment system comprises: an ammonia-alkali reaction device, a filtration device connected with the ammonia-alkali reaction device, a washing and drying device and an evaporative crystallization device which are respectively connected with the filtration device, and a biochemical treatment device positioned at an end of the evaporative crystallization device, wherein The ammonia-alkali reaction device is used to mix saline glycerine wastewater with ammonia gas and carbon dioxide to react to obtain a mixed solution.

The filtration device filters the mixed solution to obtain calcium carbonate and a filtrate containing ammonium chloride and, glycerine.

The washing and drying device washes and dries the filtered calcium carbonate and then outputs the calcium carbonate as a product.

The evaporative crystallization device evaporates, cools and crystallizes the filtrate containing ammonium chloride and glycerine to obtain an ammonium chloride crystal product.

The biochemical treatment device performs biochemical treatment on a crystallization mother solution containing a small amount of ammonium chloride and glycerine to finally discharge the crystallization mother solution under standards.

Preferably, the ammonia-alkali reaction device is a stirred-tank reactor, a tubular reactor or a tower reactor.

Preferably, a molar ratio of the ammonia gas, to the calcium chloride introduced into the ammonia-alkali reaction device is (2 to 4):1, and a molar ratio of the carbon dioxide to the calcium chloride is (1 to 3):1.

Preferably, the evaporative crystallization device performs multi-effect evaporation; evaporating stages are 2 to 5 effects; and a final effect evaporation solution is cooled and crystallized to obtain an ammonium chloride crystal product.

Preferably, the saline glycerine wastewater treatment system further comprises a water storage tank and a return pipeline; the water storage tank is positioned at an end of the biochemical treatment device, and the return pipeline is communicated between the water storage tank and a main reaction device.

The main reaction device is a cyclization reaction device for producing the propylene oxide and the epichlorohydrin, and the return, pipeline is used to introduce the biochemically treated water resources that reach the standards in the water storage tank into the main reaction device to prepare calcium hydroxide.

Another purpose of the present invention is to provide a saline glycerine wastewater treatment technology with simple technological operation and low energy consumption.

To achieve the above purpose, the present invention adopts the following technical solution:

A saline glycerine wastewater treatment technology specifically comprises the following steps:

(1) continuously introducing the saline glycerine wastewater, the ammonia gas and the carbon dioxide into the ammonia-alkali reaction device for mixing and reacting to obtain a mixed solution;

(2) pumping the mixed solution into the filtration device for filtration to obtain calcium carbonate and a filtrate containing ammonium chloride and glycerine; and subsequently washing and drying the calcium carbonate by the washing and drying device and then outputting the calcium carbonate as a product;

(3) inputting the filtrate containing ammonium chloride and glycerine into the evaporative crystallization device for evaporation and crystallization by cooling to obtain an ammonium chloride crystal product; subsequently, circulating part of the crystallization mother solution back to the evaporative crystallization device, and conducting biochemical treatment on the remaining crystallization mother solution.

The filtrate with the ammonium chloride and the glycerine enters the multi-effect evaporation section, and the final effect outlet material of the evaporator enters a crystallizer. Ammonium chloride crystals are precipitated after flash evaporation and cooling, and the ammonium chloride is recrystallized and then dried and outputted as a product. Part of the crystallization mother solution is circulated back to the evaporator, and another part is biochemically treated, thereby greatly reducing the biochemical pressure of sewage.

The present invention invents a saline glycerine wastewater treatment technology with low energy consumption and simple treatment technology through the idea of an ammonia-alkali reaction by means of practical experience. Calcium and chlorine are changed into calcium carbonate and ammonium chloride and then extracted separately by means of the principle of an alkali production technology, and finally the glycerine wastewater containing a small amount of chloride ions is biochemically treated. The principle is as follows:

The solubility of the calcium chloride in water is very high, and reaches 100 g at 30° C., and is dissolved in the water by 1:1. The glycerine and the water are also miscible in any ratio, and the calcium chloride, the glycerine and the water are difficult to separate directly. The solubility of the calcium carbonate in the water is $10^{-4}$. If the conversion of the calcium chloride is achieved, a separation effect is immediate.

The solubility of the glycerine in the water is high, and it is difficult to find a proper solvent to extract the glycerine. Generally, the glycerine cannot be effectively extracted; and moreover, part of extractant stays in the wastewater, thereby increasing the complexity and the COD value of raw wastewater.

Because the conversion of the calcium chloride to the calcium carbonate in ammonia-alkali production has a reaction basis and the reaction theory is clear, a reaction-separation path is reasonably planned to effectively separate calcium ions and chloride ions in the wastewater by means of the reaction principle. Specifically, chemical reactions involved in the saline glycerine wastewater treatment technology disclosed by the present invention are as follows:

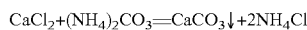

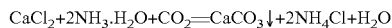

Preferably, in the step (1), the molar ratio of the ammonia gas to the calcium chloride is (2 to 4):1; the molar ratio of the carbon dioxide to the calcium chloride is (1 to 3):1; reaction temperature is 25° C.-90° C.; reaction pressure is 101-200 kPa; and reaction time is 30-60 min.

Preferably, in the step (2), the filtration temperature of precipitated calcium carbonate is controlled as 40° C.-70° C.

In the present invention, when the mixed solution is filtered, the temperature of the filtrate is controlled and kept as 40° C.-70° C. to prevent the ammonium chloride from being precipitated. The calcium carbonate is filtered, washed and dried, and then outputted as a product.

Preferably, in the step (3), crystallization temperature is controlled as 10° C.-40° C.

Preferably, in the step (3), liquid after the biochemical treatment enters the water storage tank for discharge tinder standards or flows into the main reaction device through the return pipeline for recycling.

It can be known from the above technical solution that compared with the prior art, the present invention provides a saline glycerine wastewater treatment system and technology, and has the following excellent characteristics:

(1) The saline glycerine wastewater treatment system disclosed by the present invention is reasonable in design. Calcium ions and chloride ions in the wastewater are respectively extracted through the reasonable arrangement of the above device; the extraction rate of the calcium ions is more than 99% and the extraction rate of the chloride ions is more than 95%. By-products of high-quality calcium carbonate and ammonium chloride products are produced.

(2) In the saline glycerine wastewater treatment technology disclosed by the present invention, by optimizing the technological process and operating conditions, the present invention first proposes an "ammonia-alkali reaction" method to solve the problem of saline glycerine wastewater treatment, which mainly solves the problem of a large amount of calcium chloride-containing glycerine wastewater produced in the production process of propylene oxide and epichlorohydrin in chlor-alkali industry, and places emphasis on solving the problems that calcium chloride recycled by a traditional method is low in quality, is basically accumulated as solid waste and is difficult to treat, and chloride ions have adverse effects on the biochemical process of wastewater in wastewater treatment. The treatment technology is simple and low in energy consumption, can also obtain high-quality products and has high economic benefits and social environmental protection benefits.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

Figure 1:
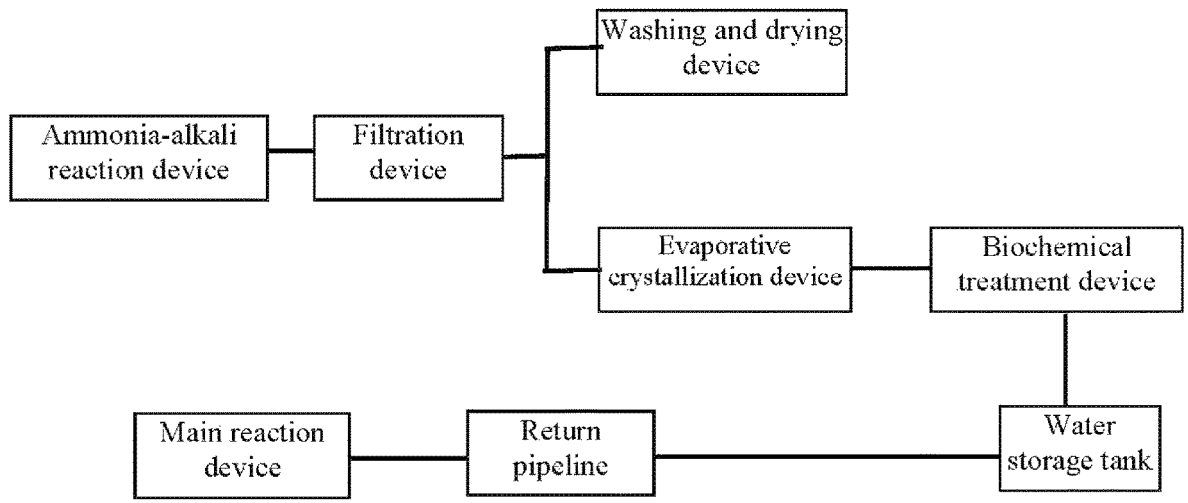
FIG. 1 is a schematic diagram of a saline glycerine wastewater treatment system provided by the present invention.
Figure 2:
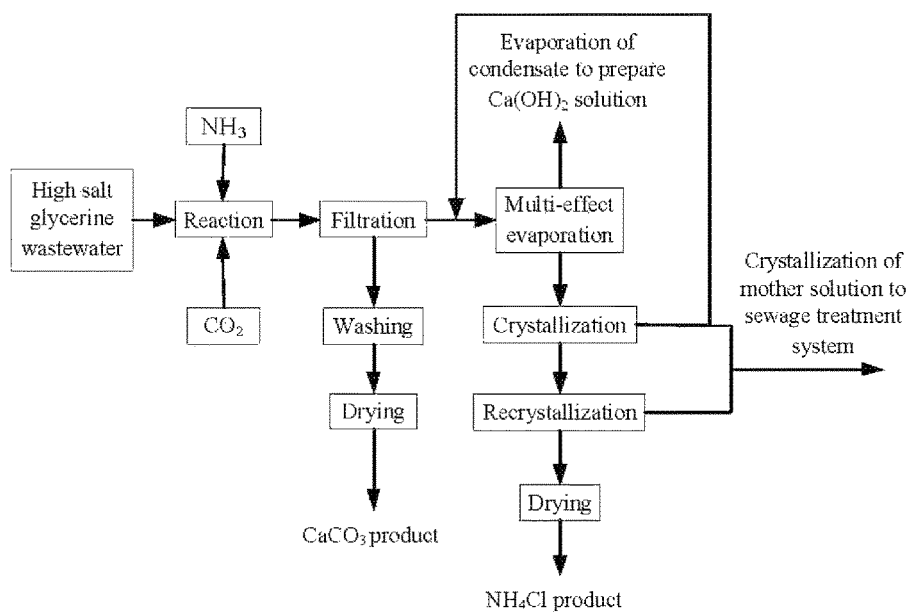
FIG. 2 is a flow chart of a saline glycerine wastewater treatment technology provided by the present invention.

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiments of the present invention disclose a saline glycerine wastewater treatment system and technology having simple technology and low energy consumption and capable of obtaining high-quality products.

To better understand the present invention, the present invention is further described in detail below by the following embodiments, but shall not be interpreted as a limitation to the present invention. Some non-essential improvements and adjustments made by those skilled in the art according to the contents of the present invention shall also be deemed to fall within the protection scope of the present invention.

The saline glycerine wastewater treatment system specifically has the following implementation solution:

Implementation Solution I:

The present invention discloses a saline glycerine wastewater treatment system which comprises: a stirred-tank type ammonia-alkali reaction device, a filtration device connected with the tank type ammonia-alkali reaction device, a washing and drying device and an evaporative crystallization device which are respectively connected with the filtration device, and a biochemical treatment device positioned at an end of the evaporative crystallization device, wherein The tank type ammonia-alkali reaction device is used to mix saline glycerine wastewater with ammonia gas and carbon dioxide to react to obtain a mixed solution.

The filtration device filters the mixed solution to obtain calcium carbonate and a filtrate containing ammonium chloride and glycerine.

The washing and drying device washes and dries the filtered calcium carbonate and then outputs the calcium carbonate as a product.

The evaporative crystallization device evaporates, cools and crystallizes the filtrate containing ammonium chloride and glycerine to obtain an ammonium chloride crystal product.

The biochemical treatment device performs biochemical treatment on a crystallization mother solution containing a small amount of ammonium chloride and glycerine to finally discharge the crystallization mother solution under standards.

To further optimize, the above technical solution, a molar ratio of the ammonia gas to the calcium chloride introduced into the tank type ammonia-alkali reaction device is (2 to 4):1, and a molar ratio of the carbon dioxide to the calcium chloride is (1 to 3):1.

To further optimize the above technical solution, the evaporative crystallization device performs multi-effect evaporation; evaporating stages are 2 to 5 effects; and a final effect evaporation solution is cooled and crystallized to obtain an ammonium chloride crystal product.

To further optimize the above technical solution, the saline glycerine wastewater treatment system further comprises a water storage tank and a return pipeline; the water storage tank is positioned at an end of the biochemical treatment device, and the return pipeline is communicated between the water storage tank and a main reaction device.

Implementation Solution II:

The present invention discloses a saline glycerine wastewater treatment system which comprises: a stirred-tubular ammonia-alkali reaction device, a filtration device connected with the tubular ammonia-alkali reaction device, a washing and drying, device and an evaporative crystallization device which are respectively connected with the filtration device, and a biochemical treatment device positioned at an end of the evaporative crystallization device, wherein The tabular ammonia-alkali reaction device is used to mix saline glycerine wastewater with ammonia gas and carbon dioxide to react to obtain a mixed solution.

The filtration device filters the mixed solution to obtain calcium carbonate and a filtrate containing ammonium chloride and glycerine.

The washing, and drying device washes and dries the filtered calcium carbonate and then outputs the calcium carbonate as a product.

The evaporative crystallization device evaporates, cools and crystallizes the filtrate containing ammonium chloride and glycerine to obtain an ammonium chloride crystal product.

The biochemical treatment device performs biochemical treatment on a crystallization mother solution containing a small amount of ammonium chloride and glycerine to finally discharge the crystallization mother solution under standards.

To further optimize the above technical solution, a molar ratio of the ammonia gas to the calcium chloride introduced into the tank type ammonia-alkali reaction device is (2 to 4):1, and a molar ratio of the carbon dioxide to the calcium chloride is (1 to 3):1.

To further optimize the above technical solution, the evaporative crystallization device performs multi-effect evaporation: evaporating stages are 2 to 5 effects; and a final effect evaporation solution is cooled and crystallized to obtain an ammonium chloride crystal product.

To further optimize the above technical solution, the saline glycerine wastewater treatment system further comprises a water storage tank and a return pipeline; the water storage tank is positioned at an end of the biochemical treatment device, and the return, pipeline is communicated between the water storage tank and a main reaction device.

Implementation Solution III:

The present invention discloses a saline glycerine wastewater treatment system which comprises: a stirred-tower type ammonia-alkali reaction device, a filtration device connected with the tower type ammonia-alkali reaction device, a washing and drying device and an evaporative crystallization device which are respectively connected with the filtration device, and a biochemical treatment device positioned at an end of the evaporative crystallization device, wherein The tower type ammonia-alkali reaction device is used to mix saline glycerine wastewater with ammonia gas and carbon dioxide to react to obtain a mixed solution.

The filtration device filters the mixed solution to obtain calcium carbonate and a filtrate containing ammonium chloride and, glycerine.

The washing and drying device washes and dries the filtered calcium carbonate and then outputs the calcium carbonate as a product.

The evaporative crystallization device evaporates, cools and crystallizes the filtrate containing ammonium chloride and glycerine to obtain an ammonium chloride crystal product.

The biochemical treatment device performs biochemical treatment on a crystallization mother solution containing a small amount of ammonium chloride and glycerine to finally discharge the crystallization mother solution under standards.

To further optimize the above technical solution, a molar ratio of the ammonia gas to the calcium chloride introduced into the tank type ammonia-alkali reaction device is (2 to 4):1, and a molar ratio of the carbon dioxide to the calcium chloride is (1 to 3):1.

To further optimize the above technical solution, the evaporative crystallization device performs multi-effect evaporation; evaporating stages are 2 to 5 effects; and a final effect evaporation solution is cooled and crystallized to obtain an ammonium chloride crystal product.

To further optimize the above technical solution, the saline glycerine wastewater treatment system further comprises a water storage tank and a return pipeline; the water storage tank is positioned at an end of the biochemical treatment device, and the return pipeline is communicated between the water storage tank and a main reaction device.

The present invention also discloses a saline glycerine wastewater treatment technology which specifically comprises the following steps:

(1) continuously introducing the saline glycerine wastewater, the ammonia gas and the carbon dioxide into the ammonia-alkali reaction device, and mixing and reacting under the conditions of reaction temperature of 25° C.-90° C. and reaction pressure of 101-200 kPa for 30-60 min to obtain a mixed solution, wherein a molar ratio of the ammonia gas to the calcium chloride is (2 to 4):1, and a molar ratio of the carbon dioxide to the calcium chloride is (1 to 3):1;

(2) pumping the mixed solution into the filtration device for filtration under the temperature condition of 40° C.-70° C. to obtain calcium carbonate and a filtrate containing ammonium chloride and glycerine; and subsequently washing and drying the calcium carbonate by the washing and drying device and then outputting the calcium carbonate as a product;

(3) inputting the filtrate containing ammonium chloride and glycerine into the evaporative crystallization device for evaporation and crystallization by cooling at 10° C.-40° C. to obtain an ammonium chloride crystal product; subsequently, circulating part of the crystallization mother solution back to the evaporative crystallization device, and conducting biochemical treatment on the remaining crystallization mother solution; and enabling liquid after the biochemical treatment to enter the water storage tank for discharge under standards or flow into the main reaction device through the return pipeline for recycling.

The technical solution of the saline glycerine wastewater treatment technology disclosed by the present invention is further described below in combination with specific embodiments.

Embodiment 1

High-salt glycerine wastewater from the production process of the propylene oxide comprises calcium chloride with content of 163.06 g/L, COD with content of 8000 mg/L and wastewater treatment quantity of 10 m$^3$/h. Specifically, the above wastewater treatment technology is as follows:

(1) continuously introducing the high-salt glycerine wastewater, the ammonia gas and the carbon dioxide into the stirred or pumping returning type ammonia-alkali reaction device, wherein the molar ratio of the ammonia gas to the calcium chloride is 2.5:1 and the molar ratio of the carbon dioxide to the calcium chloride is 2:1; controlling the temperature of the ammonia-alkali reaction device as 50° C. and reaction residence time as 50 min; and at this moment, precipitating calcium carbonate solid;

(2) pumping the material with the calcium carbonate solid at an outlet of the ammonia-alkali reaction device into the filtration device for filtering the calcium carbonate; during filtration, maintaining the temperature of the filtrate in the range of 40-45° C. to prevent the ammonium chloride from being precipitated; and filtering, washing and drying the calcium carbonate, and then taking the calcium carbonate as a product with purity of 99.5%;

(3) enabling the filtrate with ammonium chloride and glycerine to enter a three-effect evaporation section, with the ammonium chloride content of the final effect outlet material of the evaporator as 60 g/L, to enter a crystallizer; after flash evaporation and cooling to 40° C., precipitating ammonium chloride crystals; recrystallizing the ammonium chloride, then drying the ammonium chloride to output the the ammonium chloride as a product with purity of 99.2%; circulating part of the crystallization mother solution back to the evaporator, and conducting a sewage treatment procedure on another part; and conducting biochemical treatment after reaching an index;

(4) after one hour from treatment by the treatment technology, recovering 1451 kg of calcium carbonate with a calcium ion recovery rate of 98.7%, and recovering 1416.2 kg of ammonium chloride with a chloride ion recovery rate of 90.1%.

Embodiment 2

High-salt glycerine wastewater from the production process of the propylene oxide comprises calcium chloride with content of 163.06 g/L, COD with content of 8000 mg/L and wastewater treatment quantity of 10 m$^3$/h. Specifically, the above wastewater treatment technology is as follows:

(1) continuously introducing the high-salt, glycerine wastewater, the ammonia gas and the carbon dioxide into the stirred or pumping returning type ammonia-alkali reaction device, wherein the molar ratio of the ammonia gas to the calcium chloride is 2.0:1 and the molar ratio of the carbon dioxide to the calcium chloride is 1.5:1; controlling the temperature of the ammonia-alkali reaction device as 50° C. and reaction residence time as 30 min; and at this moment, precipitating calcium carbonate solid;

(2) pumping the material with the calcium carbonate solid at an outlet of the ammonia-alkali reaction device into the filtration device for filtering the calcium carbonate; during filtration, maintaining the temperature of the filtrate in the range of 40-45° C. to prevent the ammonium chloride from being precipitated; and filtering, washing and, drying the calcium carbonate, and then taking the calcium carbonate as a product with purity of 99.5%;

(3) enabling the filtrate with ammonium chloride and glycerine to enter a three-effect evaporation section, with the ammonium chloride content of the final effect outlet material of the evaporator as 63 g/L, to enter a crystallizer; after flash evaporation and cooling to 40° C., precipitating ammonium chloride crystals; recrystallizing the ammonium chloride, then drying the ammonium chloride to output the ammonium chloride as a product with purity of 99.5%; circulating part of the crystallization mother solution back to the evaporator, and conducting a sewage treatment procedure on another part; and conducting biochemical treatment after reaching an index;

(4) after one hour from treatment by the treatment technology, recovering 1403 kg of calcium carbonate with a calcium ion recovery rate of 95.4%, and recovering 1402.2 kg of ammonium chloride with a chloride ion recovery rate of 89.2%.

Embodiment 3

High-salt glycerine wastewater from the production process of the propylene oxide comprises calcium chloride with content of 163.06 g/L, COD with content of 8000 mg/L and wastewater treatment quantity of 10 m$^3$/h. Specifically, the above wastewater treatment technology is as follows:

(1) continuously introducing the high-salt glycerine wastewater, the ammonia gas and the carbon dioxide into the stirred or pumping returning type ammonia-alkali reaction device, wherein the molar ratio of the ammonia gas to the calcium chloride is 3.0:1 and the molar ratio of the carbon dioxide to the calcium chloride is 2:1; controlling the temperature of the ammonia-alkali reaction device as 60° C. and reaction residence time as 60 min; and at this moment, precipitating calcium carbonate solid;

(2) pumping the material with the calcium carbonate solid at an outlet of the ammonia-alkali reaction device into the filtration device for filtering the calcium carbonate; during filtration, maintaining the temperature of the filtrate in the range of 45-50° C. to prevent the ammonium chloride from being precipitated; and filtering, washing and drying the calcium carbonate, and then taking the calcium carbonate as a product with purity of 99.5%;

(3) enabling the filtrate with ammonium chloride and glycerine to enter a three-effect evaporation section, with the ammonium chloride content of the final effect outlet material of the evaporator as 65 g/L, to enter a crystallizer; after flash evaporation and cooling to 35° C., precipitating ammonium chloride crystals; recrystallizing the ammonium chloride, then drying the ammonium chloride to output the ammonium chloride as a product with purity of 99.6%; circulating part of the crystallization mother solution back to the evaporator, and conducting a sewage treatment procedure on another part; and conducting, biochemical treatment after reaching an index;

(4) after one hour from treatment by the treatment technology, recovering 1464.5 kg of calcium carbonate with a calcium ion recovery rate of 99.6%, and recovering 1502.7 kg of ammonium chloride with a chloride ion recovery rate of 95.6%.

Embodiment 4

High-salt glycerine wastewater from the production process of the propylene oxide comprises calcium chloride with content of 260.7 g/L, COD with content of 9200 mg/L and wastewater treatment quantity of 10 m$^3$/h. Specifically, the above wastewater treatment technology is as follows:

(1) continuously introducing the high-salt glycerine wastewater, the ammonia gas and the carbon dioxide into the stirred or pumping returning type ammonia-alkali reaction device, wherein the molar ratio of the ammonia gas to the calcium chloride is 3.0:1 and the molar ratio of the carbon dioxide to the calcium chloride is 2.0:1; controlling the temperature of the ammonia-alkali reaction device as 60° C. and, reaction residence time as 60 min; and at this moment, precipitating calcium carbonate solid;

(2) pumping the material with the calcium carbonate solid at an outlet of the ammonia-alkali reaction device into the filtration device for filtering the calcium carbonate; during filtration, maintaining the temperature of the filtrate in the range of 45-50° C. to prevent the ammonium chloride from being precipitated; and, filtering, washing and drying the calcium carbonate, and then taking the calcium carbonate as a product with purity of 99.3%;

(3) enabling the filtrate with ammonium chloride and glycerine to enter a three-effect evaporation section, with the ammonium chloride content of the final effect outlet material of the evaporator as 60 g/L, to enter a crystallizer; after flash evaporation and cooling to 35° C., precipitating ammonium chloride crystals; recrystallizing the ammonium chloride, then drying the ammonium chloride to output the ammonium chloride as a product with purity of 99.5%; circulating part of the crystallization mother solution back to the evaporator, and conducting a sewage treatment procedure on another part; and conducting, biochemical treatment after reaching an index;

(4) after one hour from treatment by the treatment technology, recovering 2317.9 kg of calcium carbonate with a calcium ion recovery rate of 98.6%, and recovering 2354.7 kg of ammonium chloride with a chloride ion recovery rate of 93.7%.

Embodiment 5

High-salt glycerine wastewater from the production process of the propylene oxide comprises calcium chloride with content of 260.7 g/L, COD with content of 9200 mg/L and wastewater treatment quantity of 10 m$^3$/h. Specifically, the above wastewater treatment technology is as follows:

(1) continuously introducing the high-salt glycerine wastewater, the ammonia gas and the carbon dioxide into the stirred or pumping returning type ammonia-alkali reaction device, wherein the molar ratio of the ammonia gas to the calcium chloride is 3:1 and the molar ratio of the carbon dioxide to the calcium chloride is 2.5:1; controlling, the temperature of the ammonia-alkali reaction device as 70° C. and reaction residence time as 60 min; and at this moment, precipitating calcium carbonate solid;

(2) pumping the material with the calcium carbonate solid at an outlet of the ammonia-alkali reaction device into the filtration device for filtering the calcium carbonate; during filtration, maintaining the temperature of the filtrate in the range of 45-50° C. to prevent the ammonium chloride from being precipitated; and filtering, washing and drying the calcium carbonate, and then taking the calcium carbonate as a product with purity of 99.6%;

(3) enabling the filtrate with ammonium chloride and glycerine to enter a three-effect evaporation section, with the ammonium chloride content of the final effect outlet material of the evaporator as 63 g/L, to enter a crystallizer; after flash evaporation and cooling to 35° C., precipitating ammonium chloride crystals; recrystallizing the ammonium chloride, then drying the ammonium chloride to output the ammonium chloride as a product with purity of 99.5%; circulating part of the crystallization mother solution back to the evaporator, and conducting a sewage treatment procedure on another part; and conducting biochemical treatment after reaching an index;

(4) after one hour from treatment by the treatment technology, recovering 2329.6 kg of calcium carbonate with a calcium ion recovery rate of 99.1%, and recovering 2394.9 kg of ammonium, chloride with a chloride ion recovery rate of 95.3%.

Each embodiment in the description is described in a progressive way. The difference of each embodiment from each other is the focus of explanation. The same and similar parts among all of the embodiments can be referred to each other.

The contents of the present invention are not limited to the contents of the above embodiments, and a combination of one or more embodiments can also achieve the purposes of the present invention.

In order to further verify the excellent effects of the present invention, the inventors also conduct the following single factor experiments on the reaction part:

Experiment 1: Optimization Experiment of Molar Ratio of Ammonia Gas to Calcium Chloride Some reaction parameter conditions in the saline glycerine wastewater treatment technology are limited: the molar ratio of the carbon dioxide to the calcium chloride is 2:1; the temperature of the ammonia-alkali reaction device is controlled as 50° C.; reaction residence time is 50 min; the crystallization temperature of the ammonium chloride is 35° C.; and only the parameter of the molar ratio of the ammonia gas to the calcium chloride is changed, and meanwhile, the yields of products of calcium carbonate and ammonium chloride are respectively determined. Specific results are shown in Table 1:

TABLE 1

| Ammonia:$CaCl_2$ (mol) | 2:1 | 2.5:1 | 3:1 | 3.5:1 | 4:1 |
|---|---|---|---|---|---|
| Calcium carbonate yield (%) | 87.1 | 95.3 | 96.1 | 96.4 | 96.6 |
| Ammonium chloride yield (%) | 88.5 | 96.2 | 96.4 | 96.7 | 96.7 |

Experiment 2: Optimization Experiment of Molar Ratio of Carbon Dioxide to Calcium Chloride Some reaction parameter conditions in the saline glycerine wastewater treatment technology are limited: the molar ratio of the ammonia gas to the calcium chloride is 2:1; the temperature of the ammonia-alkali reaction device is controlled as 50° C.; reaction residence time is 40 min; the crystallization temperature of the ammonium chloride is 35° C.; and only the parameter of the molar ratio of the carbon dioxide to the calcium chloride is changed, and meanwhile, the yields of products of calcium carbonate and ammonium chloride are respectively determined. Specific results are shown in Table 2:

TABLE 2

| $CO_2$:$CaCl_2$ (mol) | 1:1 | 1.5:1 | 2:1 | 2.5:1 | 3:1 |
|---|---|---|---|---|---|
| Calcium carbonate yield (%) | 71.2 | 85.3 | 94.4 | 95.4 | 96.6 |
| Ammonium chloride yield (%) | 73.5 | 87.2 | 96.3 | 96.7 | 96.9 |

Experiment 3: Optimization Experiment of Reaction Temperature

Some reaction parameter conditions in the saline glycerine wastewater treatment technology are limited: the molar ratio of the carbon dioxide to the calcium chloride is 2.5:1; the molar ratio of the ammonia gas, to the calcium chloride is 3:1; reaction residence time is 40 min; the crystallization temperature of the ammonium chloride is 35° C.; and only the temperature in the ammonia-alkali reaction device is changed, and meanwhile, the yields of products of calcium carbonate and ammonium chloride are respectively determined. Specific results are shown in Table 3:

TABLE 3

| Reaction Temperature (° C.) | 40 | 50 | 60 | 70 | 80 | 90 |
|---|---|---|---|---|---|---|
| Calcium carbonate yield (%) | 91.2 | 95.1 | 99.4 | 99.6 | 99.9 | 99.9 |
| Ammonium chloride yield (%) | 93.6 | 94.5 | 95.4 | 95.7 | 95.8 | 96.2 |

Experiment 4: Optimization Experiment of Reaction Time

Some reaction parameter conditions in the saline glycerine wastewater, treatment technology are limited: the molar ratio of the carbon dioxide to the calcium chloride is 2.5:1; the molar ratio of the ammonia gas to the calcium chloride is 3:1; the temperature of the ammonia-alkali reaction device is controlled as 60° C.; the crystallization temperature of the ammonium chloride is 35° C.; and only reaction residence time is changed, and meanwhile, the yields of products of calcium carbonate and ammonium chloride are respectively determined. Specific results are shown in Table 4:

TABLE 4

| Reaction time (min) | 20 | 30 | 40 | 50 | 60 | 70 |
|---|---|---|---|---|---|---|
| Calcium carbonate yield (%) | 87.4 | 98.2 | 98.9 | 99.4 | 99.9 | 99.9 |
| Ammonium chloride yield (%) | 89.6 | 91.5 | 92.1 | 93.5 | 93.9 | 94.9 |

Experiment 5: Optimization Experiment of Crystallization Temperature of Ammonium Chloride Some reaction parameter conditions in the saline glycerine wastewater treatment technology are limited: the molar ratio of the carbon dioxide to the calcium chloride is 2.5:1; the molar ratio of the ammonia gas to the calcium chloride is 3:1; the temperature of the ammonia-alkali reaction device is controlled as 60° C.; reaction residence time is 1 h; and only the crystallization temperature of the ammonium chloride is changed, and meanwhile, the yields of products of calcium carbonate and ammonium chloride are respectively determined. Specific results are shown in Table 5:

TABLE 5

| Crystallization temperature (° C.) | 15 | 20 | 30 | 35 | 40 | 45 |
|---|---|---|---|---|---|---|
| Calcium carbonate yield (%) | 99.9 | 99.9 | 99.9 | 99.9 | 99.9 | 99.9 |
| Ammonium chloride yield (%) | 97.1 | 96.7 | 96.1 | 95.3 | 92.9 | 87.9 |

By combining the optimization experiments of reaction part conditions of experiment 1 to experiment 5 and considering the material cost, optimization reaction conditions of the saline glycerine wastewater treatment technology disclosed by the present invention are: the molar ratio of the carbon dioxide to the calcium chloride is 2.5:1; the molar ratio of the ammonia gas to the calcium chloride is 3:1; the temperature in the ammonia-alkali reaction device is controlled as 70° C.; reaction residence time is 60 min; and the crystallization temperature of the ammonium chloride is 30° C.

Each embodiment in the description is described in a progressive way. The difference of each embodiment from each other is the focus of explanation. The same and similar parts among all of the embodiments can be referred to each other. For a method disclosed by the embodiments, because the method corresponds to a method disclosed by the embodiments, the method is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A method for treating saline glycerin wastewater, comprising:
    (1) continuously introducing the saline glycerin wastewater, an ammonia gas and a carbon dioxide into an ammonia-alkali reaction device for mixing and reacting to obtain a mixed solution;
    (2) pumping the mixed solution into a filtration device for filtration to obtain calcium carbonate and a filtrate containing ammonium chloride and glycerin; and subsequently washing and drying the calcium carbonate by a washing and drying device and then outputting the calcium carbonate as a product;
    (3) inputting the filtrate containing ammonium chloride and glycerin into an evaporative crystallization device for multi-effect evaporation and crystallization by cooling to obtain an ammonium chloride crystal product; wherein evaporating stages are 2 to 5 effects; subsequently, circulating part of a crystallization mother solution back to the evaporative crystallization device, and conducting a biochemical treatment for remaining crystallization mother solution; wherein the biochemical treated remaining crystallization mother solution is introduced by a return pipeline into a main reaction device to prepare calcium hydroxide.

2. The method for treating saline glycerin wastewater according to claim 1, wherein in the step (1), the molar ratio of the ammonia gas to a calcium chloride is (2 to 4): 1; the molar ratio of the carbon dioxide to the calcium chloride is (1 to 3): 1; reaction temperature is 25-90° C.; reaction pressure is 101-200 kPa; and reaction time is 30-60 min.

3. The method for treating saline glycerin wastewater according to claim 1, wherein in the step (2), a filtration temperature of precipitated calcium carbonate is controlled as 40-70° C.

4. The method for treating saline glycerin wastewater according to claim 1, wherein in the step (3), crystallization temperature is controlled at 10-40° C.

* * * * *